United States Patent [19]

Sasaki

[11] Patent Number: 5,231,257
[45] Date of Patent: Jul. 27, 1993

[54] ELECTRICAL DISCHARGE MACHINING CONTROL UNIT

[75] Inventor: Shiro Sasaki, Aichi, Japan

[73] Assignee: Mitsubishi Denki K.K., Tokyo, Japan

[21] Appl. No.: 792,604

[22] Filed: Nov. 15, 1991

[30] Foreign Application Priority Data

Nov. 15, 1990 [JP] Japan .................. 2-309176

[51] Int. Cl.⁵ .................. B23H 7/18
[52] U.S. Cl. .................. 219/69.13; 219/69.16
[58] Field of Search .............. 219/69.13, 69.16, 69.17, 219/69.18, 69.19

[56] References Cited

U.S. PATENT DOCUMENTS 4,822,970 4/1989 Levy et al. .................. 219/69.16
5,117,083 5/1992 Kawamura .................. 219/69.16

FOREIGN PATENT DOCUMENTS 56-107831 8/1981 Japan .
57-138534 8/1982 Japan .
61-44528 3/1986 Japan .................. 219/69.16
62-10769 3/1987 Japan .
63-2613 1/1988 Japan .................. 219/69.16
64-11714 1/1989 Japan .................. 219/69.16

Primary Examiner—Geoffrey S. Evans
Attorney, Agent, or Firm—Sughrue, Mion, Zinn, Macpeak & Seas

[57] ABSTRACT

An electrical discharge machine, which performs electrical discharge machining by applying a voltage pulse across an electrode and a workpiece, includes an adaptive control unit for maintaining the machine in a predetermined machining state at the start of the electrical discharge machining operation. The adaptive control unit detects an electrical discharge machining fault during the start of the electrical discharge machining process, adaptively changes the machining conditions to avoid faults, and restores the original machining conditions thereafter.

19 Claims, 9 Drawing Sheets

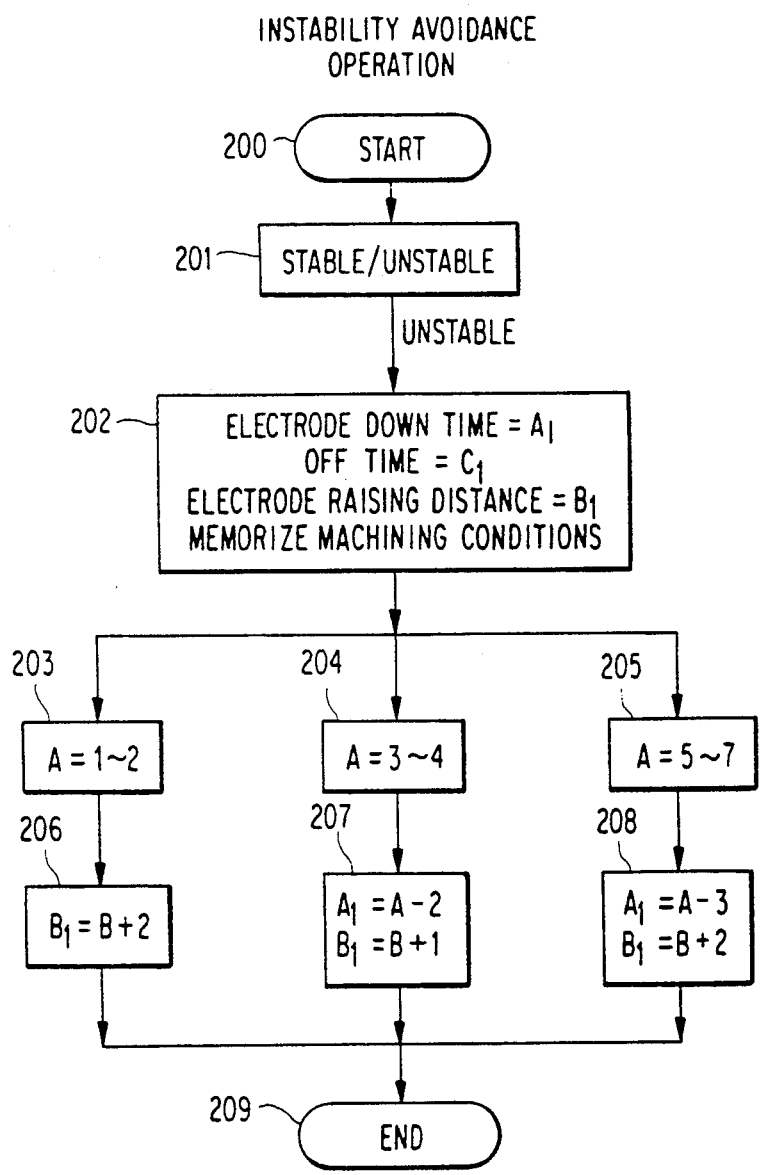

— WITHOUT AVOIDANT CONTROL

MACHINING START COMPLETION SIGNAL

ELECTRICAL DISCHARGE MACHINING CONTROL UNIT

BACKGROUND OF THE INVENTION

The present invention relates to an adaptive control unit for an electrical discharge machine, and more particularly to an adaptive control unit of an electrical discharge machine which maintains the machine in a desired machining state at the start of electrical discharge machining.

FIG. 13 illustrates a conventional adaptive control unit for an electrical discharge machine, which is disclosed in Japanese Patent Publication No. 10769-1987. The electrical discharge machine includes a machining electrode 1, a workpiece 2, a machining tank 3 filled with a dielectric 4, a spindle 5 for moving the machining electrode 1 in a Z direction, a drive motor 6 for driving the spindle 5, a speed/position detector 7 for detecting the travel speed and position of the spindle 5, an electrode position control section 21 for controlling the position of the machining electrode 1 by providing a drive command to the drive motor 6, a machining power supply 22 for supplying a machining voltage across the machining electrode 1 and workpiece 2, and a detected value processor 23, responsive to a detection signal from the position detector 7 and a machining gap voltage, for providing a feedback command to the electrode position control section 21 and to the machining power supply 22, and for providing an electrode bottom point raising command or machining command to an adaptive control section 31. The adaptive control section 31 transmits a machining command to the electrode position control section 21 and machining power supply 22 in accordance with the incoming command signal from the detected value processor 23.

In operation, a pulse-shaped voltage is applied across the machining electrode 1 and workpiece 2 by the machining power supply 22 causing an electrical discharge to occur therebetween in the dielectric. The workpiece 2 is machined by the electrical discharge and the feed operation of the machining electrode 1. The electrode position control section 21 compares an average machining gap voltage provided by the detected value processor 23 with a reference voltage to maintain a predetermined machining gap between the machining electrode 1 and workpiece 2 for electrical discharge, and controls the drive motor 6 in accordance with the differential voltage (i.e., the difference between the average machining gap voltage and the reference voltage) to control the position or feed rate of the machining electrode 1.

The gap between the machining electrode 1 and workpiece 2 is generally in the range of about ten microns to several tens of microns. When the area to be machined is wide, it is difficult to remove the chips produced by the machining through this gap which, in turn, causes the chips to reside in the machining gap. Moreover, the amount of chips generated is more than what typically can be removed. As a result, a faulty electrical discharge (e.g., electrical discharge concentrating in one area) is more likely to occur. This, however, can be prevented by detecting a faulty state and suppressing the amount of chips being produced or removing more chips.

FIGS. 14A and 14B illustrate the movement of the machining electrode 1, wherein FIG. 14A shows the movement of the electrode during normal machining, and FIG. 14B illustrates the electrode movement where a fault has occurred in the machining gap.

In the machining process, the machining electrode 1 oscillates over a distance of about several microns to several tens of microns. During a normal machining operation, the electrode bottom point 101 (i.e., where the machining electrode 1 switches from lowering to rising), gradually lowers in the course of machining. If a fault occurs in the machining gap, however, the electrode bottom point 101 tends to rise as shown in FIG. 14B. Hence, to prevent the rise of the electrode bottom point 101 and to suppress the amount of chips being produced, the width of the current pulse supplied by the machining power supply 22 is decreased, and the electrical discharge dwell width is increased. In order to remove more chips, the regular rising distance of the machining electrode 1 can be increased to increase the "pumping" action created by electrode movement and consequent dielectric flow.

Referring back to FIG. 13, the detected value processor 23 detects the electrode bottom point 101 in accordance with the motion of the machining electrode 1 provided by the position detector 7 and puts out a signal to the adaptive control section 31 that indicates whether the electrode bottom point 101 is rising or lowering. When the bottom point rises above a predetermined threshold value, the adaptive control section 31 determines that a fault has occurred in the machining gap and transmits a command (e.g., for decreasing the current pulse width and increasing the electrical discharge dwell width so as to suppress the amount of chips being produced or for raising the machining electrode 1 so as to enhance the chip removing capability), to the electrode position control section 21 and machining power supply 22.

From the above description, it should be apparent that shortening the current pulse width or increasing the regular raising amount of the machining electrode 1 is necessary to prevent a faulty electrical discharge from occurring.

A second conventional electrical discharge machine is described in Japanese Patent Disclosure Publication No. 107831-1981. This machine accurately determines the machining gap state during machining using an electrode position detecting means, which detects a difference between the deepest position of the electrode relative to the workpiece and the current electrode position. A machining gap state determining means detects an increase in the difference as a faulty machining gap state and outputs a signal accordingly.

As described above, the adaptive control unit of a conventional electrical discharge machine determines that a fault has occurred in the machining gap when the electrode rises or when the difference between the deepest position of the electrode fed to the workpiece and the current position thereof has exceeded a predetermined threshold value. The adaptive control unit then reduces the current pulse width and elongates the electrical discharge width to suppress the stock removal ability (i.e., in other words, the amount of chips being produced) or to raise the electrode for enhancing the chip removing capability.

When electrical discharge machining is performed with a large machining electrode (i.e., when the area to be machined is large, about 25 cm$^2$ or greater, at the start of electrical discharge machining), a conventional control unit can detect the occurrence of an arc phenomenon and conduct avoidant control of machining conditions. But the conventional device will sometimes erroneously determine that the arc phenomenon has occurred and perform avoidance control of the machining conditions, which reduces machining efficiency. That is, the machining time is increased by the operation of elongating the electrical discharge dwell width, reducing the electrode down time, increasing the electrode raising amount, etc. The arc phenomenon is liable to occur particularly when a machining electrode, made of copper, is used for electrical discharge machining without flushing dielectric through the machining gap.

In addition, when a large machining electrode is used for electrical discharge machining, the known art determines that the electrical discharge machining state is faulty for a certain period of time and continues to perform avoidant control of the machining conditions because the difference between the deepest position of the electrode fed to the workpiece and the current position thereof increases at the start of electrical discharge machining. The difference between the deepest and current positions of the electrode is not eliminated immediately due to the large area to be removed by electrical discharge machining.

SUMMARY OF THE INVENTION

Accordingly, it is a general object of the present invention to provide an adaptive control unit of an electrical discharge machine which detects an electrical discharge machining fault upon the start of the electrical discharge machining process, changes the adaptive machining condition to avoid any faults and restores the machining condition after avoidant control and which is free of the above-mentioned problems and disadvantage.

In accordance with the above and other objects, the present invention provides an adaptive control unit of an electrical discharge machine which performs electrical discharge machining by applying a voltage pulse across an electrode and a workpiece, including a detecting means for detecting a relief amount of the electrode from a deepest position thereof, means for avoiding unstable operation of the electrical discharge machine when the detected relief amount exceeds a first predetermined threshold value, and machining condition changing means for changing the machining conditions to predetermined conditions after the detected relief amount falls below a second predetermined threshold value which occurs after the unstable operations have been avoided.

Further in accordance with the above objects, the present invention provides an adaptive control unit of an electrical discharge machine which performs electrical discharge machining by applying a voltage pulse across an electrode and a workpiece, including a detecting means for detecting a relief amount of the electrode from the deepest position thereof, means for calculating a relief amount of the electrode from the deepest position thereof by averaging the detected relief amount over several jumps, and means for avoiding unstable operation of the electrical discharge machine when both the detected relief amount and the calculated relief amount during a predetermined period from the start of the electrical discharge machining have exceeded a predetermined threshold value.

Yet further, the invention provides an adaptive control unit of an electrical discharge machine which performs electrical discharge machining by applying a voltage pulse across an electrode and a workpiece, which includes detecting means for detecting a relief amount of the electrode from a deepest position thereof, counting means for counting a predetermined number of jumps of the electrode beginning when the voltage pulse across the electrode and the workpiece reaches a predetermined level, comparing means for comparing the detected relief amount with a first predetermined threshold value, storage means, responsive to the counting means and the comparing means, for storing machining conditions for the electrical discharge machine if the counter has not reached the predetermined value and the detected relief amount exceeds the first predetermined threshold, means for changing the machining conditions so as to avoid unstable operation of the electrical discharge machine, machining start completion determining means for comparing the detected value with a second predetermined threshold value, and means for restoring the machining conditions stored in the storage means when the detected value falls below the second predetermined threshold value.

Still further, the present invention accomplishes the above objects by providing an adaptive control unit of an electrical discharge machine which performs electrical discharge machining by applying a voltage pulse across an electrode and a workpiece, including a detecting means for detecting a relief amount of the electrode from a deepest position thereof, period setting means for defining a period of time beginning when the voltage pulse across the electrode and the workpiece reaches a predetermined level, fault determining means for detecting if the detected relief amount exceeds a first predetermined threshold value which constitutes a fault, storage means for storing machining conditions for the electrical discharge machine if the fault determining means detects a fault within the period of time, means for changing the machining conditions so as to avoid unstable electrical discharge machining after the fault has been detected, machining start completion determining means for comparing the detected value with a second predetermined threshold value, and means for restoring the machining conditions stored in the storage means when the detected value falls below the second predetermined threshold value and the fault has been avoided.

Even further, the invention provides a method of adaptive control for an electrical discharge machine which performs electrical discharge machining by applying a voltage pulse across an electrode and a workpiece, which includes the steps of detecting a voltage across the electrode and the workpiece, detecting a relief amount of the electrode from a deepest position, comparing the voltage with a predetermined voltage value, counting a number of jumps of the electrode when the voltage falls below the predetermined level and outputting a first high signal until the count reaches the predetermined number, comparing the detected relief amount with a first predetermined threshold value and outputting a second high signal when the detected relief amount exceeds the first predetermined threshold value, storing machining conditions for the electrical discharge machine if both the first signal and the second signal are high, changing the machining conditions of the electrical discharge machine to avoid unstable operation of the electrical discharge machine, comparing the detected relief amount with a second predetermined threshold value and outputting a third high signal when the detected relief amount falls below the predetermined threshold value to indicate a completion of the start of electrical discharge machining, and restoring the machining conditions at the completion of the start of electrical discharge machining.

Still further, the invention provides a method of adaptive control for an electrical discharge machine which performs electrical discharge machining by applying a voltage pulse across an electrode and a workpiece, including the steps of defining a period of time beginning with the start of electrical discharge machining, detecting a fault condition by determining whether a detected relief amount of the electrode from a deepest position thereof exceeds a predetermined threshold value within the period of time, storing machining conditions for the electrical discharge machine if the fault condition is detected, adjusting the machining conditions of the electrical discharge machine so as to avoid any unstable operation if the fault condition is detected, detecting a completion of the start of the electrical discharge machining by determining when the detected relief amount of the electrode from a deepest position thereof falls below a second predetermined threshold value, and restoring the machining conditions when the completion is detected.

The above and other objects, features, and advantages of the invention will become more apparent from the following detailed description taken in conjunction with the accompanying drawings.

BRIEF DESCRIPTION OF THE DRAWINGS

FIGS. 8A and 8B are flowcharts which illustrate the adaptive control operation when a fault is detected and the return to normal operation.

DESCRIPTION OF THE PREFERRED EMBODIMENTS

Figure 1:
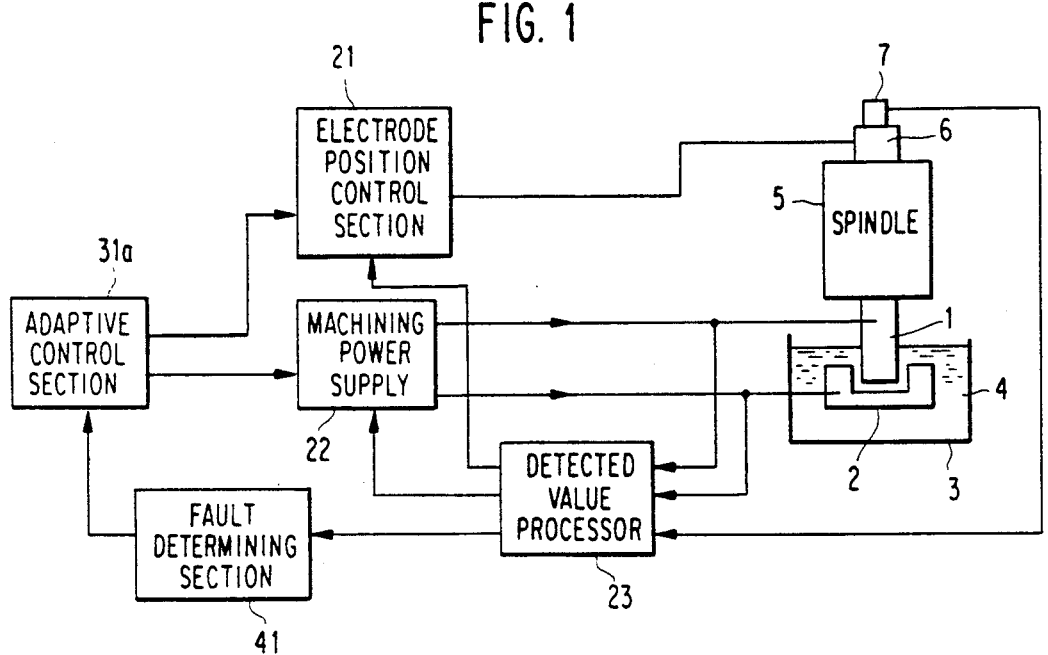
FIG. 1 is a diagram illustrating one embodiment of an adaptive control unit for an electrical discharge machine according to the present invention.

FIG. 1 illustrates an embodiment of an adaptive control unit of an electrical discharge machine according to the present invention.

In FIG. 1, reference numerals 1 to 7 and 21 to 23 designate components identical to those of the conventional adaptive control unit described above and will therefore not be described here. Reference numeral 31a indicates an adaptive control section for transmitting commands to the electrode position control section 21 and machining power supply 22 in accordance with a signal from a fault determining section 41. The fault determining section determines whether the electrical discharge machine is operating in a normal or faulty condition in accordance with an incoming signal from the detected value processor 23.

Figure 2:
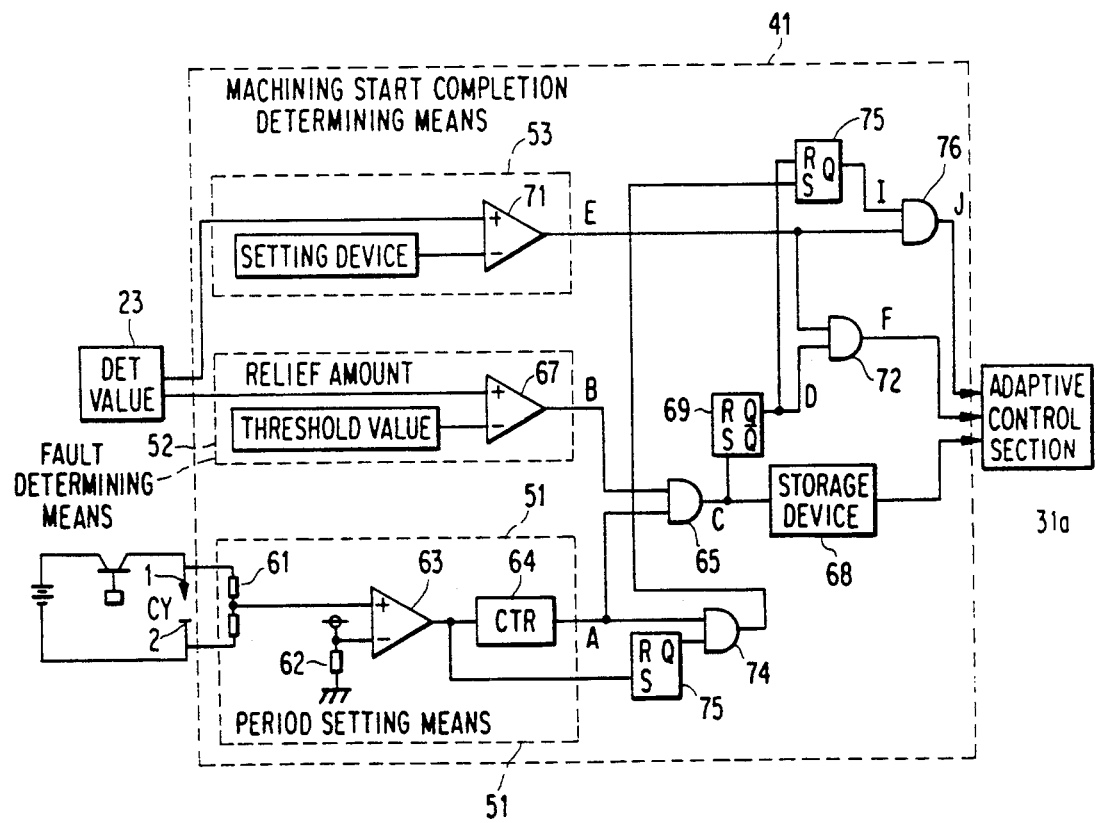
FIG. 2 illustrate a detailed configuration of a fault determining section shown in FIG. 1.

The fault determining section 41, as shown in FIG. 2, includes a period setting means 51 for defining a period between the start of the electrical discharge machining process and the determination of whether electrical discharge machining is faulty or not, fault determining means 52 for determining whether electrical discharge machining is faulty or not, and machining start completion determining means 53 for determining whether the machining electrode 1 has discharged over its overall surface.

The operation of the FIG. 1 embodiment will now be described.

Figure 3:
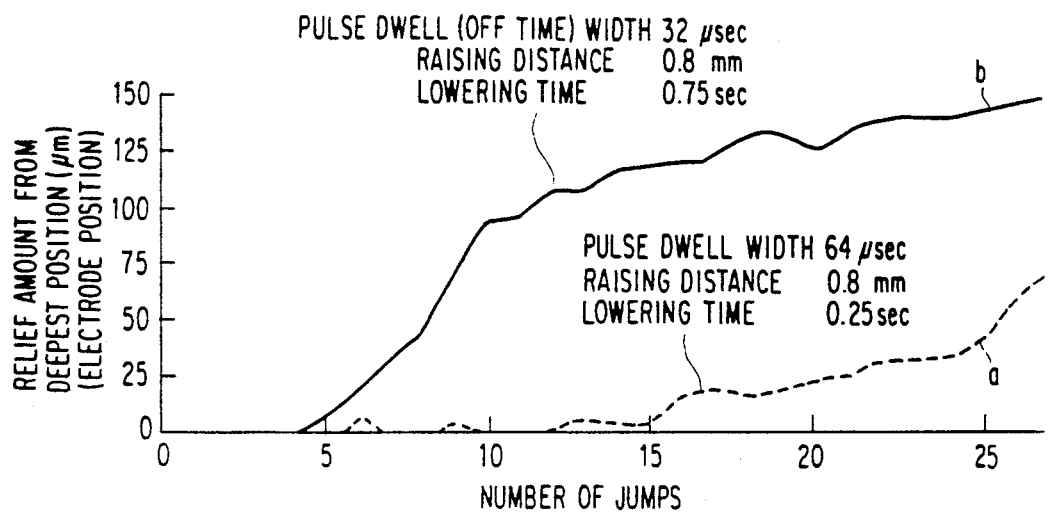
FIG. 3 illustrates the movement of a 100 mm square machining electrode employed for electrical discharge machining.

FIG. 3 illustrates the movement of a square-shaped (100 mm on each side) machining electrode employed for electrical discharge machining under the following conditions:

Machining electrode: 100 mm square, copper
Current peak value: 55 A
Current pulse width: 1024 μsec Curve a (FIG. 3) shows the movement of the machining electrode 1 when no arc occurs and curve b shows that of the machining electrode 1 in which an arc occurs.

In a normal electrical discharge machining operation, the offset or relief amount of the machining electrode 1 gradually rises after the start of electrical discharge machining, after several jumps, as indicated by curve a in FIG. 3. However, when the machining conditions set at the start of the electrical discharge are severe, (which may cause arcing to occur), the size of the offset amount of the machining electrode rises rapidly beginning only several jumps after the start of electrical discharge machining and continues to rise thereafter, as indicated by curve b. Further, the amount of the rise (the relief from the deepest position of the machining electrode 1) is larger than what would normally occur during electrical discharge machining. An abnormal condition of the machining state at the beginning of machining may be distinguished on this basis.

The size of the relief of the machining electrode 1 is caused to increase to enhance the chip removing capability. Alternatively, the lowering time of the machining electrode 1 may be reduced to suppress the amount of chips being generated. Other measures may include reducing the width of the current pulse supplied by the machining power supply 22 and/or increasing the electrical discharge dwell width.

Any electrical discharge machining fault occurring within the period of 25 jumps from the start of electrical discharge machining (i.e., at an early stage of the machining process) is detected by the fault determining section 41 shown in FIG. 1. An example of detection of the relief amount from the deepest position within 25 jumps after the start of the electrical discharge machining by means of the fault determining section 41 is shown in FIG. 2.

Figure 6A:
FIGS. 6A, 6B, 6C, 6D, 6E, and 6F illustrate a timing cart for the movement of the machining electrode of FIG. 5, and the operation timing of the circuit shown in FIG. 2.
Figure 6B:

The period setting means 51 determines whether the machining electrode 1 has approached the workpiece 2 and whether machining has started. The voltage across the machining electrode 1 and workpiece 2 is detected by a voltage divider 61. This detected voltage is entered into a comparator 63 where it is then compared with a voltage value set by a voltage setting device 62 (e.g., 40 V or less). Specifically, when the voltage value detected by the voltage divider 61 has reached a voltage equivalent to 40 V or less, the comparator 63 outputs a "high" signal to a counter 64. The counter 64 then begins to count the number of jumps (one jump being equal to a sequence of a rise, a fall, and another rise of the machining electrode 1) of the machining electrode 1. The counter outputs a "high" signal to a determining circuit 65 at the start of counting and when the number of jumps reaches a predetermined value (e.g., when the number of jumps is 25), a "low" signal is applied to the determining circuit 65 (FIG. 6A), thereby setting the period for determining a machining fault. A second input of the determining circuit 65 receives a signal from the fault determining means 52.

The fault determination process employed by the fault determining means 52 uses the relief amount from the deepest position as a state amount. The relief amount from the deepest position computed by the detected value processor 23 and a threshold value of the relief amount, which is used as a reference and is stored in a setting device 66, are entered into a comparator 67. The comparator 67 outputs a "high" signal to the determining circuit 65 when the relief amount from the deepest position most recently computed exceeds the predetermined threshold value stored in the setting device 66.

Figure 6C:
Figure 6D:
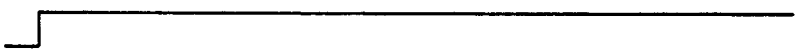

The determining circuit 65 detects a faulty machining operation and outputs a "high" signal when the respective outputs of the counter 64 and the comparator 67 are "high". (FIG. 6C)

Upon detecting a faulty discharge, the determining circuit 65 outputs a set signal to an input S of a flip-flop 69 and transmits a command signal to cause the current machining conditions to be stored into a storage device 68. The storage device 68 stores the machining conditions so that, after the determination of machining start completion, the process can return to the original machining conditions defined before the fault.

The storage device 68 then transmits a command signal to the adaptive control section 31a which sends a command signal to the electrode position control section 21 to reduce the lowering time of the machining electrode 1 and to increase the raising distance thereof. By performing avoidant control in this manner, faulty electrical discharge machining is more easily avoided.

Referring to FIG. 8A, there is shown a flowchart illustrating the adaptive control process. When the adaptive control section 31a receives the command signal from the determining means 65, the avoidant control process begins in step 200. On the determination that there is an unstable operation in step 201, the current machining conditions, such as the electrode down time, electrode raising distance, off time, etc., are stored in a memory device. The process then proceeds on to steps 203, 204, and 205 where the current electrode down time (a) is judged. If the electrode down time is not very long, which is denoted in the flowchart as within the range of one to two, then the process proceeds to step 206. If the electrode down time is long, which is denoted in the flowchart as within the range of five to nine (step 205), then the process flows to step 208. Finally, if the electrode down time is somewhere in between, as determined by step 204, then the process proceeds on to step 207.

In steps 206, 207, and 208, the electrode raising time ($b_1$) and in steps 207 and 208, the electrode down time ($a_1$) are adjusted accordingly so as to avoid unstable machining operations. For instance, in step 206, the electrode raising distance ($b_1$) is increased by two, and the electrode down time ($a_1$) is not adjusted. In step 207, the electrode down time ($a_1$) is decreased by two, and the electrode raising distance ($b_1$) is increased by one. In step 208, the adjustment is somewhat greater as the electrode down time ($a_1$) is decreased by three and the electrode raising distance ($a_1$) is increased by two.

The electrode raising amount and electrode lowering time has been controlled under the following machining conditions on an experimental basis:

|  | Before Avoidant change | After Avoidant change |
| --- | --- | --- |
| Experiment 1: |  |  |
| Dwell pulse width | 128 μsec | 256 μsec |
| Electrode lowering time | 0.75 sec | 0.25 sec (at once) |
| Electrode raising distance | 0.8 mm | 0.8-1.0 ~ 1.2 mm (step by step) |
| Experiment 2: |  |  |
| Dwell pulse width | 128 μsec | 128 μsec |
| Electrode lowering time | 0.75 sec | 0.25 sec |
| Electrode raising distance | 0.8 mm | 1.2 mm |

Figure 7A:
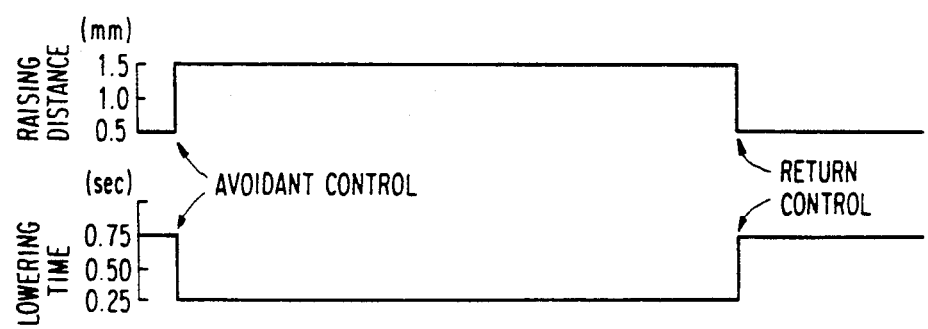
FIGS. 7A and 7B illustrate how the electrode position is adjusted during the avoidant control operation.
Figure 7B:
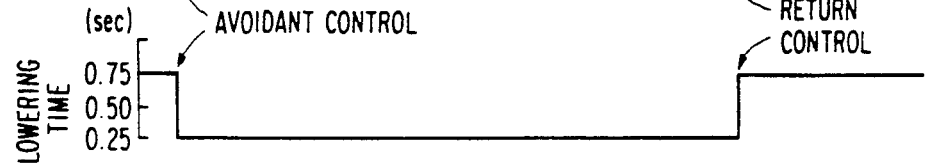

The occurrence of arc could not be avoided in Experiment 1, but arc was avoided in Experiment 2. These experiments make clear that performing avoidance control as just described (i.e., by raising the electrode all at once, as illustrated in FIGS. 7A and 7B, rather than bit by bit) has a greater effect than reducing the electrode lowering time and making an avoidant change in the electrode raising distance in a step by step manner.

The machining electrode position was sampled by the detected value processor 23 every 20 msec. The deepest position was determined when the machining electrode 1 had advanced most from the initial position, and the relief amount of the machining electrode 1 from the deepest position was calculated by using the sampling data of the deepest position and current position.

Figure 5:
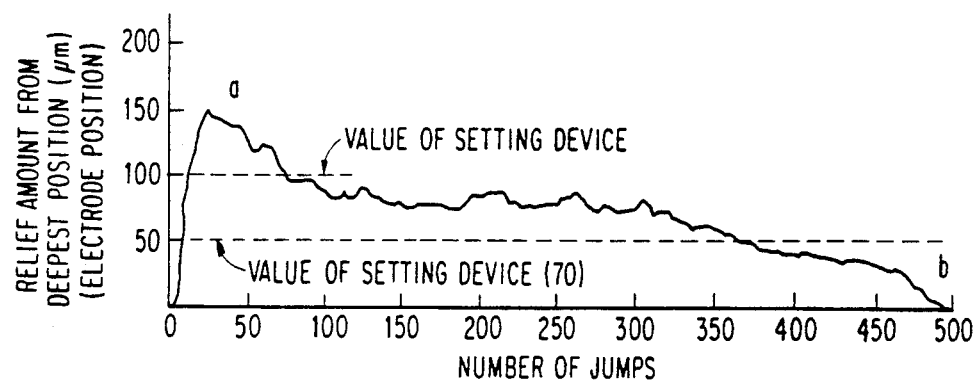
FIG. 5 illustrates the movement of a 100 mm square machining electrode employed for electrical discharge machining from when electrical discharge machining is started to when the relief amount of the machining electrode is zeroed.

After avoidant changes have been made to the machining conditions, the machining electrode 1 relief amount temporarily rises but then gradually lowers as shown in FIG. 5. FIG. 5 illustrates the motion of a 100 mm square machining electrode 1, from when electrical discharge machining is initiated to when the relief amount of the machining electrode 1 from the deepest position reaches zero. FIG. 6 illustrates an operation timing chart of the circuit shown in FIG. 2.

Generally, the machining conditions will be returned to the original conditions at the time when the relief amount of the electrode from the deepest position has been zeroed. However, since electrical discharge is evenly applied in the machining gap starting at a certain position between points a and b in FIG. 5, returning to the original machining conditions somewhat sooner (when the relief amount drops to about 50 microns) will enhance the stock removing capability, resulting in a higher overall machining speed. An example of determining when to return to the original machining conditions is shown in FIG. 2.

Figure 6E:
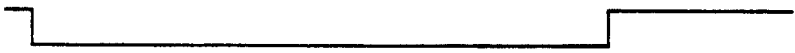

Whether machining has been started is determined by the completion determining means 53. The relief amount from the deepest position computed by the detected value processor 23 and a threshold value of the relief amount from the deepest position (typically about 50 microns), which is stored in a setting device 70, are entered into a comparator 71. The comparator 71 outputs a "high" signal to a determining circuit 72 when the current computed relief amount from the deepest position drops below the predetermined threshold value stored in the setting device 70. (FIG. 6E)

Figure 6F:

When the output Q of the flip-flop 69 is "high" and the output of the comparator 71 transitions to "high", the determining circuit 72 outputs a "high" signal indicating machining start completion. (FIG. 6F). At this point in time, the start-up phase of machining is complete, and return to the originally commanded machining parameters (stored in memory) is effected.

Figure 13:
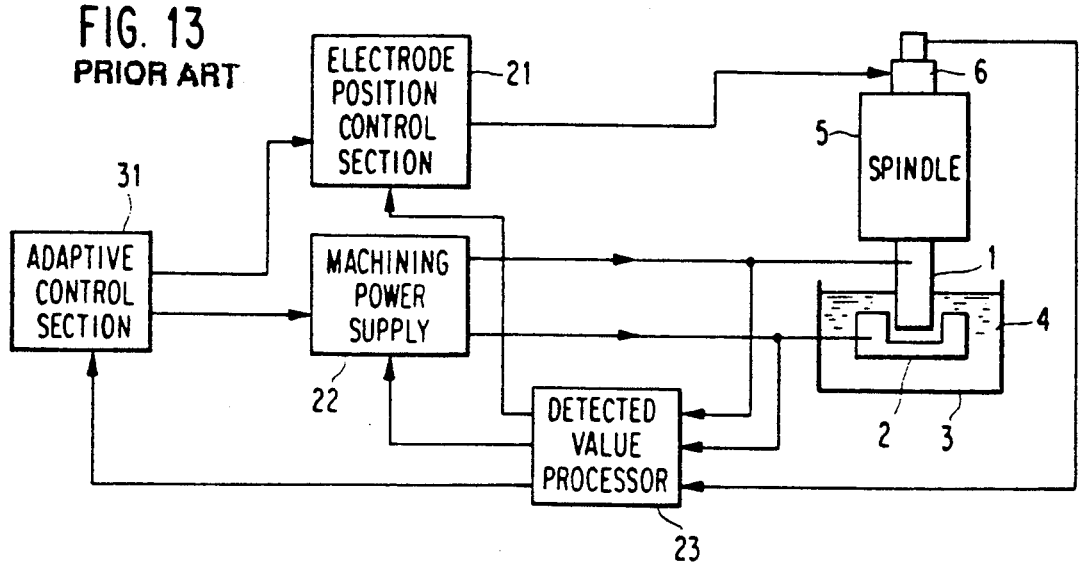
FIG. 13 illustrates an electrical discharge machine adaptive control unit of the prior art.
Figure 14A:
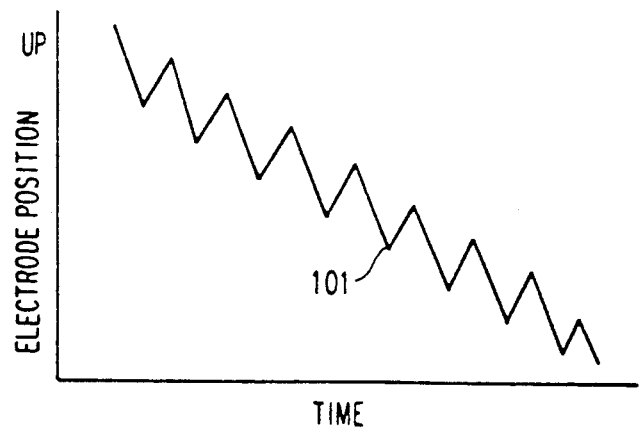
FIGS. 14A and 14B illustrate the movement of the machining electrode.
Figure 14B:
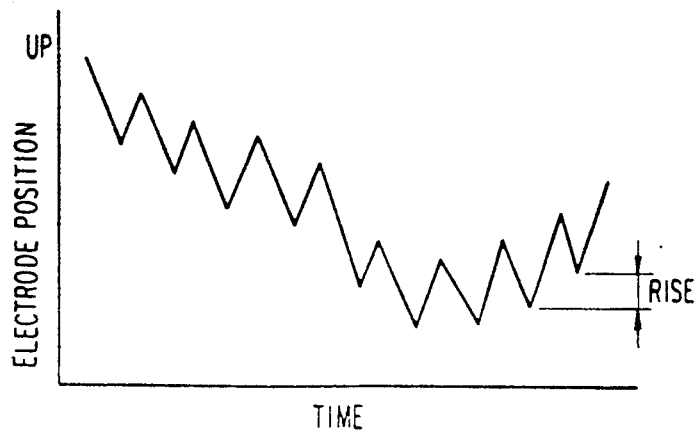

When the occurrence of a faulty electrical discharge is determined at the beginning of machining, avoidant control is exercised, the machining start completion determination is subsequently made, and the determining circuit 72 transmits a command signal to the adaptive control section 31a to return to the pre-avoidance machining conditions. On the other hand, when faulty electrical discharge does not occur, a determining circuit 76 determines that the machining start is complete. After that, the present adaptive control is stopped and switchover is made to a known adaptive control technique (e.g., similar to that performed by the conventional adaptive control unit described in Japanese Patent Publication No. 10769-1987 shown in FIG. 13).

In the process of determining machining start completion, the electrode lowering time and electrode raising distance are controlled by the adaptive control section 31a, so that the machining conditions can be returned to the original setting (i.e., machining conditions stored in the storage device 68) when the current relief amount of the electrode from the deepest position drops below the predetermined threshold value.

Figure 8B:
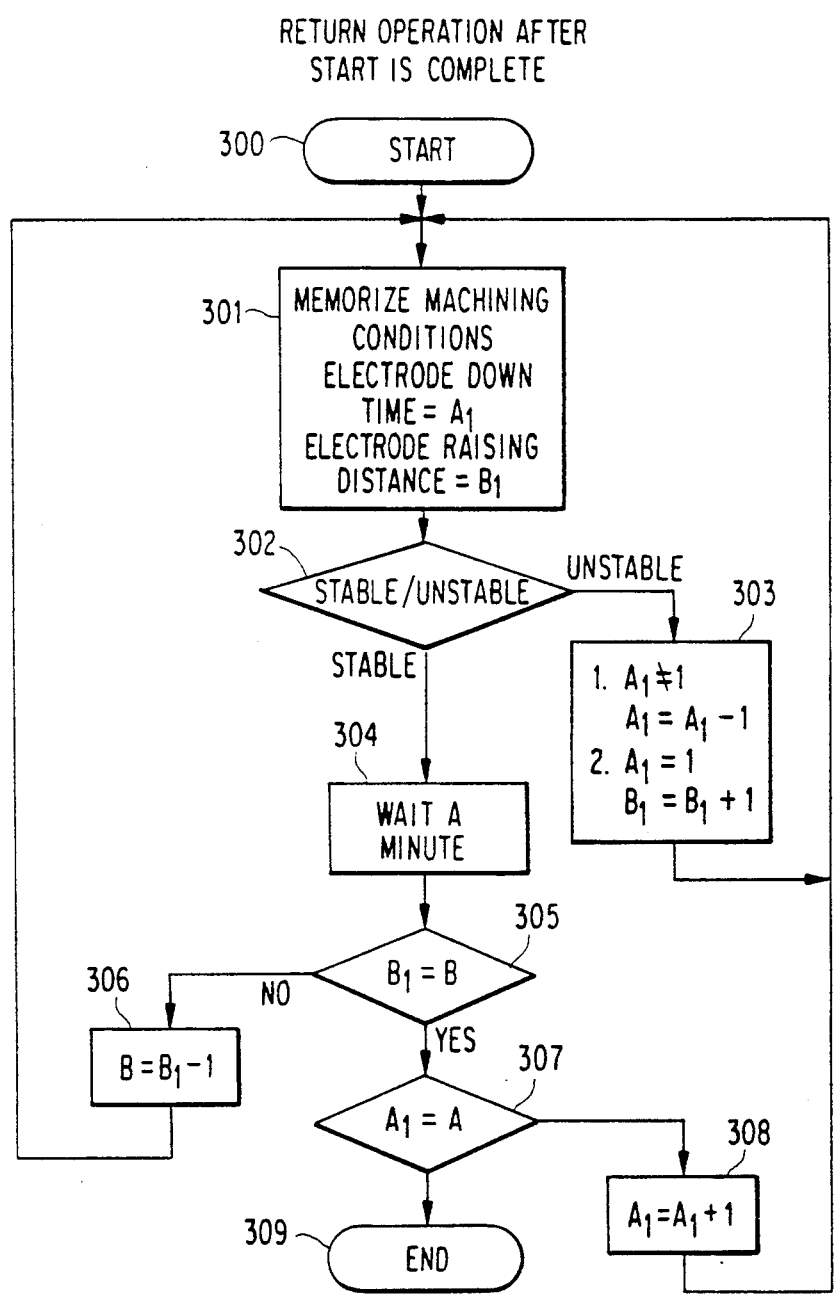

With reference to FIG. 8B, there is shown the return operation and steps thereafter. The illustrated flowchart indicates the operation once the completion of the machining start has been detected. From the starting step 300, the operation flows to step 301 where the machining conditions stored in step 202 of FIG. 8A are restored. Specifically, the electrode down time ($a_1$), the electrode raising distance ($b_1$), and the off time ($c_1$) are restored to their state just prior to the avoidance operation. Next, in step 302, it is determined whether the machining operation is stable or unstable. If unstable, the process flows to step 303 where if the electrode down time ($a_1$) does not equal one, it ($a_1$) is reduced by one, and if the electrode down time ($a_1$) does equal one, then the electrode raising distance ($b_1$) is increased by one. The process then returns to step 301.

On the other hand, if the machining operation is stable, the process flows to step 304 where a short delay is introduced. Next, in step 305, it is judged whether the electrode raising time ($b_1$) equals a value of (b) (i.e., the electrode raising time just prior to performing the avoidance operation). If not, the process flows first to step 306 where the electrode raising distance ($b_1$) is reduced by one and then to step 301. If the electrode raising distance ($b_1$) does equal (b) then in step 307, it is judged whether the electrode down time ($a_1$) equals the value of (a) (i.e., the value of the electrode down time just prior to performing the avoidance operation). If not, the process flows to step 308 where the electrode down time ($a_1$) is increased by one and then proceeds back to step 301. If the electrode down time ($a_1$) does equal (a) then the process flows to step 309 and ends.

Another process of determining the machining start completion is now described.

Figure 4:
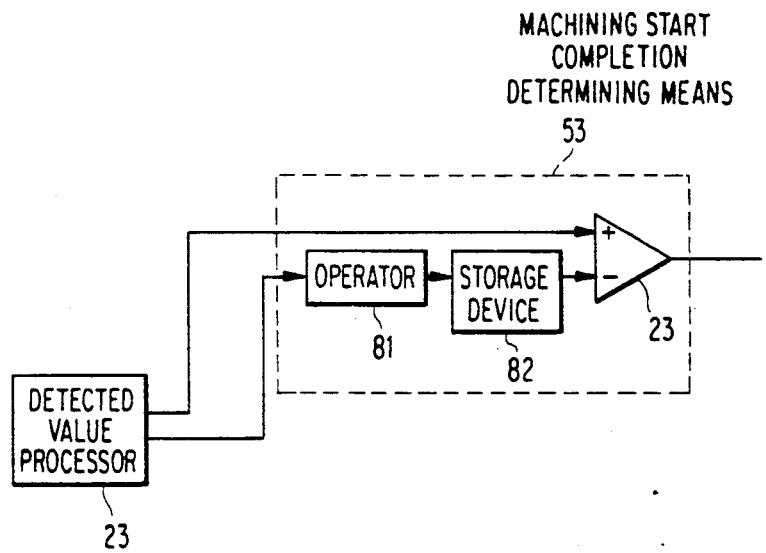
FIG. 4 is a configuration diagram showing an embodiment of another machining start completion determining means.

As shown in FIG. 4, a reference value of the relief amount of the electrode from the deepest position to determine whether the machining start is complete is selected by a circuit 81, and the resultant data is stored in a storage device 82. The current relief amount of the electrode from the deepest position put out by the detected value processor 23 is compared by a comparator 83 with the reference value of the relief amount of the electrode from the deepest position (i.e., the resultant data) for determining machining start completion. A "high" signal is put out by the comparator 83 when the current relief amount is smaller than the threshold value.

The circuit 81 determines the incoming machining electrode position from the detected value processor 23 (e.g., the relief amount of the electrode from the deepest position, using a moving average over 10 jumps), multiples it by a coefficient A (A being typically in the range of 0.2 to 0.5), and stores the result in the storage device 82. The storage device 82 compares the magnitude of each incoming data from the operator 81 output per jump and stores the larger data.

As compared to the previously described completion determining process, this completion determining process does not require the setting device 70 but allows flexible response because the relief amount of the electrode from the deepest position for determination of machining start completion varies in relation to the relief amount of the electrode from the deepest position in accordance with the machining electrode 1 area, machining conditions, dielectric treatment, etc.

Figure 9:
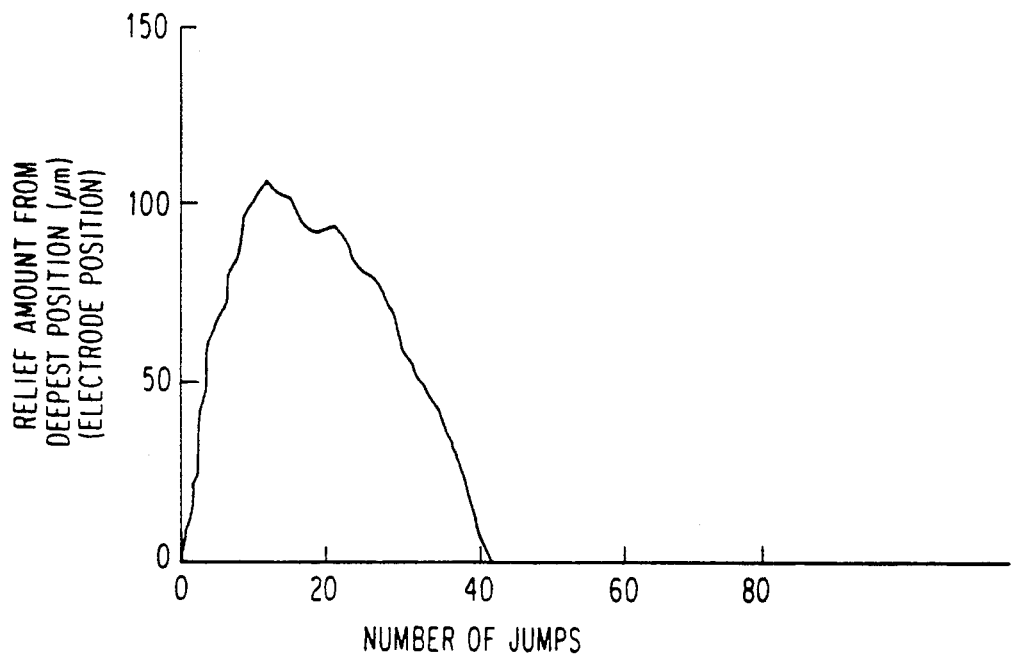
FIG. 9 illustrates the movement of a 30 mm square machining electrode employed for electrical discharge machining.
Figure 10:
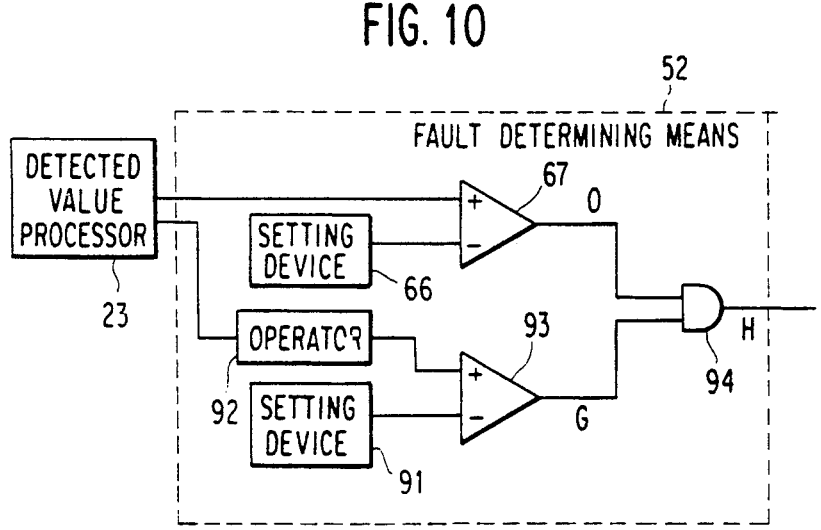
FIG. 10 shows another embodiment of a fault determining means.

Further, an adaptive control unit as shown in FIG. 10 is yet another alternative. Unlike the previous control units, this control unit does not determine that electrical discharge machining is faulty when the machining electrode moves as shown in FIG. 9. That is, the unit does not consider the electrical discharge machining process faulty when the value of the relief amount from the deepest position first exceeds the determined reference value shortly after the start of electrical discharge machining. The unit includes a setting device 91, an operator 92, a comparator 93, and a determining circuit 94 in addition to the fault determining means which is shown in FIG. 2.

Figure 12A:
Figure 12B:
Figure 12G:
Figure 12H:
Figure 12C:
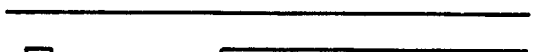
Figure 12E:
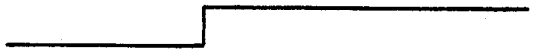
Figure 12J:
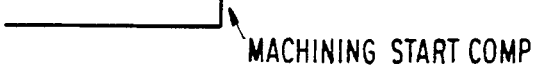

The comparator 67 outputs a "high" signal to the determining circuit 94 when the relief amount of the machining electrode 1 from the deepest position computed by the detected value processor 23 exceeds the predetermined threshold value stored in the setting device 66. With reference to FIG. 12B, the operator 92 calculates the incoming machining electrode position data from the detected value processor 23, (e.g., the relief amount of the electrode from the deepest position using the moving average per 10 jumps), which is represented by the plotted points in FIG. 9. The resultant value is compared by the comparator 93 with the predetermined threshold value stored in the setting device 91 which is identical to the value set by the setting device 66. When the electrode moves as shown in FIG. 9, the value outputted by the operator 92 does not exceed the predetermined value, and therefore the output of the comparator 93 is "low" (FIG. 12C) and the determining circuit 94 outputs a "low" signal (FIG. 12H). The determination that a faulty electrical discharge has occurred is made when the respective outputs of both comparators 67 and 93 put out "high" signals, at which time the determining circuit 94 outputs a "high" signal.

Figures 11, 12I:
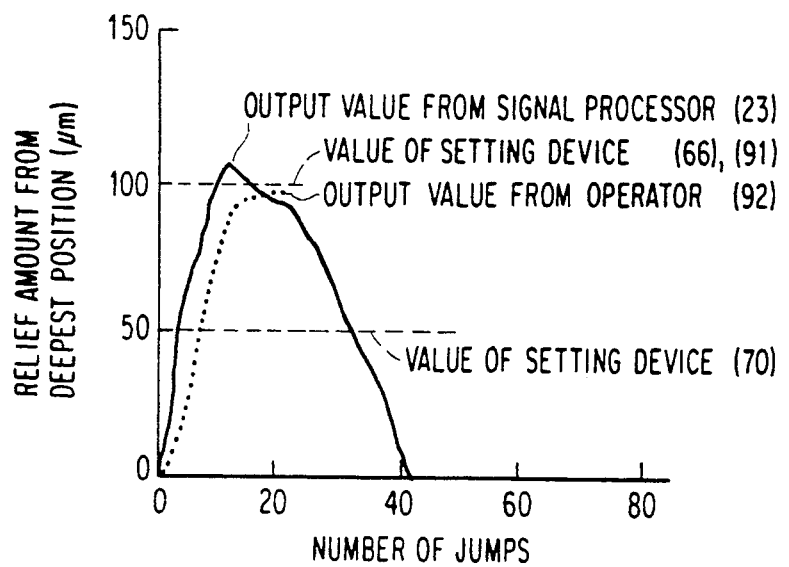
FIG. 11 is a graph showing the operation of the embodiment shown in FIG. 10.
FIGS. 12A, 12B, 12G, 12H, 12C, 12E, 12I, and 12J illustrate a timing chart showing the operation of the embodiment of FIG. 10.

When the determination that a faulty electrical discharge has occurred has not been made (i.e., when the output of the determining circuit 65 in FIG. 2 is "low"), whether the electrical discharge start-up operation is complete is determined by the determining circuit 76. When electrical discharge machining is started, the flip-flop 73 is set and outputs a "high" signal to the determining circuit 74. The inverted signal of signal A output by the counter 64 is also entered into the determining circuit 74. The determining circuit 74 transmits a set signal to the flip-flop 75 when the output of the counter 64 is switched "low". This signal causes the flip-flop 75 to output a "high" signal to the determining circuit 76 (FIG. 12I). However, when the output Q signal of the flip-flop 69 is "high" (i.e., when the electrical discharge machining has been determined faulty), the determining circuit 74 transmits a reset signal, which causes the output Q signal of the flip-flop 75 to be switched "low". The output of the comparator 71 is applied to the determining circuit 76 which outputs a "high" signal and transmits a command signal to the adaptive control section 31a to determine whether the machining start is complete.

In the described embodiments, the predetermined period after the start of electrical discharge machining is set by counting the number of jumps. As an alternative, the predetermined period can be set by simply setting a time which should equal this number of jumps.

Further, the computation of the relief amount of the electrode from the deepest position by the detected value processor 23, which is performed per sampling can be performed per jump (i.e., a difference between the deepest position during the machining electrode 1 lowering time and the past deepest position of the electrode), or the moving average of the relief amount of the electrode from the deepest position found per jump can be determined after several jumps. The process of finding the relief amount of the electrode from the deepest position is applicable to the relief amount of the electrode from the deepest position employed for the determination of machining start completion stored in the storage device 71. The deepest position during the machining electrode lowering time may be either of the highest position or the lowest position during the lowering time because whether either position has been selected only slightly changes the threshold value of the relief amount of the electrode from the deepest position employed for determining a fault and does not pose any problem in determining whether an electrical discharge machining fault has occurred.

The most effective avoidant control of the electrode lowering time and electrode raising distance by means of the adaptive control section 31 has been described.

However, a similar result is obtained by performing avoidant control using the electrical discharge dwell width and electrical discharge pulse width supplied by the machining power supply 22 or by performing the avoidant control using two or more of the electrode lowering time, electrode raising distance, electrical discharge dwell width, and electrical discharge pulse width combined.

The determination of machining start completion when the output value of the detected value processor 23 falls below the determination reference value is made by transmitting a completion determination command value to the adaptive control section 31a when an accumulative counter or a counter (which counts continuously) which is provided after the determining circuit 72 or 74 has counted to a preset number.

The control of returning to the machining conditions prior to the avoidance of the current machining conditions after the determination of machining start completion (i.e., returning to the set conditions), may be performed by switching to the adaptive control unit (as described in Japanese Patent Publication No. 10769-1987, or Japanese Patent Disclosure Publication No. 107831-1981) and by appropriately controlling the machining conditions in accordance with the determination of the machining conditions, without returning the machining conditions to the pre-avoidance machining conditions after the determination of the machining start completion.

The period setting means, fault determining means, and completion determining means which include the comparator, determining circuit, etc., are implemented in hardware but can also be implemented in software. For the hardware implementation, the determination time of the determining means is shortened and, as a result, the command signal is transmitted to the adaptive control section slower, posing no problem to the present invention.

Figure 15:
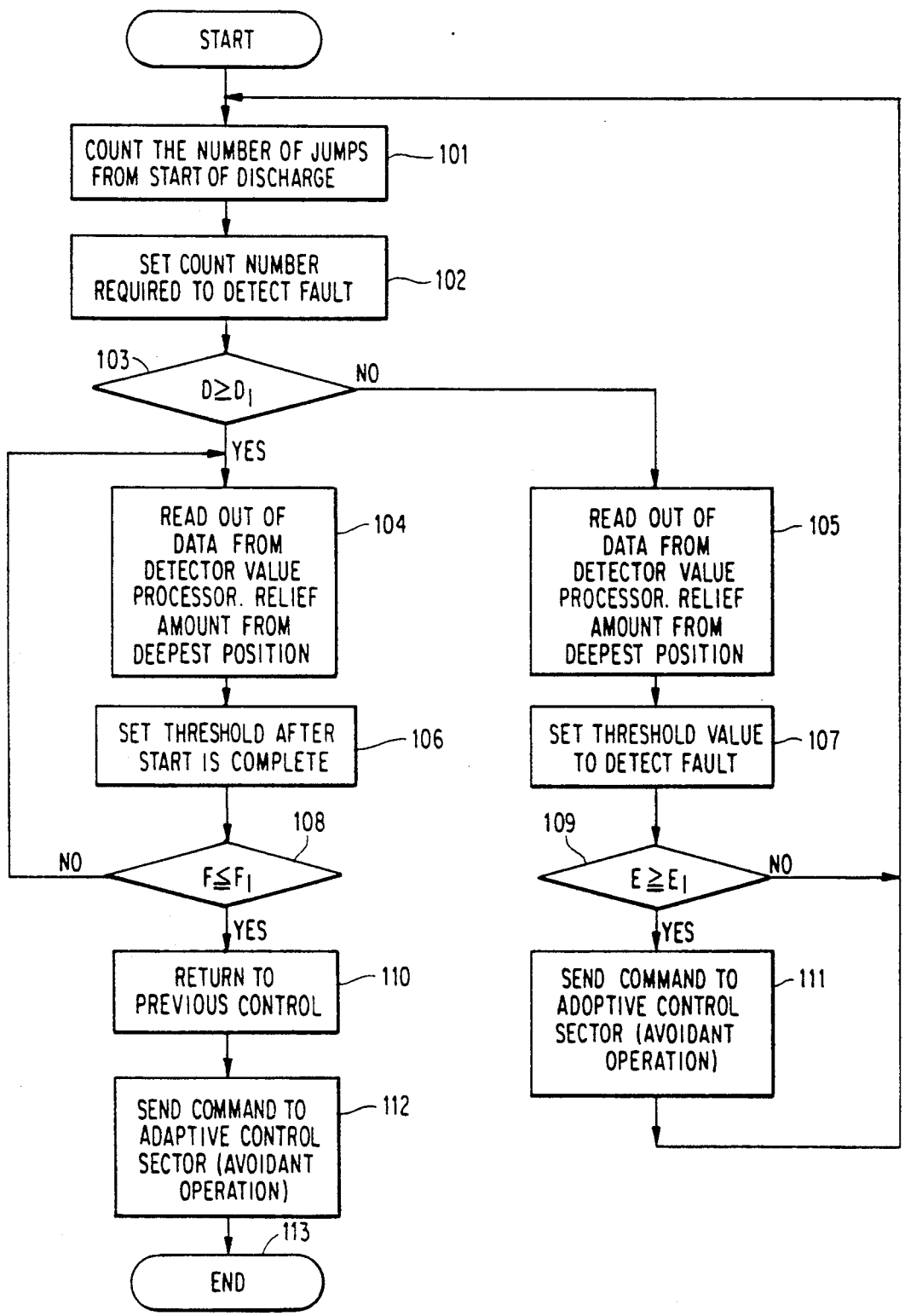
FIG. 15 illustrates a flow chart for a software implementation of the embodiment of FIG. 2.

Referring to FIG. 15, there is shown a flow chart illustrating the software implementation of the period setting means 51, fault determining means 52, and completion determining means 53. The process starts with step 100, including any necessary initialization. Next, the process flows to step 101 where the number of jumps of the electrode from the start of the machining is counted. In step 102, a predetermined value (typically, in the range of about 25) is set. The number of jumps counted is then compared with the predetermined value in step 103. From step 103, the process flows to either step 104 or step 105 depending on the results of the comparison.

If the number of jumps counted is less than the predetermined number, the process flows to step 104 where data (i.e., the relief amount from the deepest position of the electrode) is read out from the detection value processor 23. In step 107, a threshold value, which is used as a reference to detect a fault, is set. A comparison is then made in step 108 such that if the detected value is greater than or equal to the threshold value, the process flows to step 111. On the other hand, if the detected value is less than the threshold value, the process returns back to the beginning at step 101. In step 111, a command signal is sent to the adaptive control section 31a to perform avoidant operation.

Returning back to step 103, if the number of jumps counted is greater than or equal to the predetermined number, the process flows to step 104 where data (i.e., the relief amount from the deepest position of the electrode) is read out from the detection value processor 23. Next, a second threshold value is determined. In step 108, the detected value is compared with the threshold value wherein the process flows to either step 104 or step 110. If the detected value is less than or equal to the threshold value, in steps 110 and 112, the machining process returns to its previous operation by sending a command signal to the adaptive control section. Finally, the above process terminates, step 113.

It will be apparent to those skilled in the art that the invention, as described above, achieves an adaptive control unit for an electrical discharge machine which allows the relief amount of an electrode from the deepest position to be detected during a predetermined period from the start of electrical discharge machining effected by the approach of the electrode to a workpiece, and an electrical discharge machining fault to be determined in accordance with the detected value. In particular, when an electrode area is large at the start of electrical discharge machining, the control unit detects a fault only because an arc has occurred and performs avoidant control. Hence, the control unit allows adaptive control to be performed at the start of electrical discharge machining without generating arc. In addition, the control unit does not perform the avoidant control unless the arc phenomenon occurs and therefore does not affect the electrical discharge machining speed.

Further, the control unit allows machining to be performed without affecting the electrical discharge machining speed by determining that the start of electrical discharge machining is complete when the relief amount of the electrode from the deepest position detected in the course of machining drops below a predetermined threshold value after the avoidant control of the electrical discharge machining fault, and by performing the control of returning to the pre-avoidance machining conditions.

There has thus been shown a novel adaptive control unit for an electrical discharge machine which fulfills all the objects and advantages sought therefor. Many changes, modifications, variations, and other uses and applications of the subject invention, will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. An adaptive control unit of an electrical discharge machine which performs electrical discharge machining by applying a voltage pulse across an electrode and a workpiece, comprising:
   detecting means for detecting a relief amount of said electrode from a deepest position thereof;
   means for avoiding unstable operation of said electrical discharge machining when said detected relief amount exceeds a first predetermined threshold value; and
   machining condition changing means for changing the machining conditions to predetermined conditions after said detected relief amount falls below a second predetermined threshold value which occurs after said unstable operations have been avoided.

2. An adaptive control unit as recited in claim 1, wherein said machining condition changing means comprises means for restoring said machining conditions when said detected relief amount falls below a predetermined ratio of a maximum relief amount.

3. An adaptive control unit as recited in claim 1, wherein said second predetermined threshold value is less than said first predetermined threshold value.

4. An adaptive control unit as recited in claim 2, wherein said predetermined conditions comprise machining conditions employed prior to avoidance operation.

5. An electrical discharge machining adaptive control unit as recited in claim 4, wherein said machining conditions comprise a down time and raising distance of said electrode.

6. An electrical discharge machining adaptive control unit as recited in claim 2, wherein said predetermined ratio is within the range of 0.2 to 0.5.

7. An adaptive control unit of an electrical discharge machine which performs electrical discharge machining by applying a voltage pulse across an electrode and a workpiece, comprising:
   detecting means for detecting a relief amount of said electrode from the deepest position thereof;
   means for calculating a relief amount of said electrode from said deepest position thereof by averaging said detected relief amount over several jumps; and
   means for avoiding unstable operations of said electrical discharge machining when both said detected relief amount and said calculated relief amount during a predetermined period from the start of the electrical discharge machining have exceeded a predetermined threshold value.

8. An adaptive control unit of an electrical discharge machine which performs electrical discharge machining by applying a voltage pulse across an electrode and a workpiece, comprising:
   detecting means for detecting a relief amount of said electrode from a deepest position thereof;
   counting means for counting a predetermined number of jumps of said electrode beginning when said voltage pulse across said electrode and said workpiece reaches a predetermined level;
   comparing means for comparing said detected relief amount with a first predetermined threshold value;
   storage means, responsive to said counting means and said comparing means, for storing machining conditions of said electrical discharge machine if said counter has not reached said predetermined number and said detected relief amount exceeds said first predetermined threshold;
   means for changing said machining conditions so as to avoid any unstable operation of said electrical discharge machining;
   machining start completion determining means for comparing said detected value with a second predetermined threshold value; and
   means for restoring said machining conditions stored in said storage means when said detected value falls below said second predetermined threshold value.

9. An adaptive control unit of an electrical discharge machine which performs electrical discharge machining by applying a voltage pulse across an electrode and a workpiece, comprising:
   detecting means for detecting a relief amount of said electrode from a deepest position thereof;

period setting means for defining a period of time beginning when said voltage pulse across said electrode and said workpiece reaches a predetermined level;

fault determining means for detecting if said detected relief amount exceeds a first predetermined threshold value which constitutes a fault;

storage means for storing machining conditions of said electrical discharge machine if said fault determining means detects said fault within said period of time;

means for changing said machining conditions so as to avoid any unstable operation of said electrical discharge machining after said fault has been detected;

machining start completion determining means for comparing said detected value with a second predetermined threshold value; and means for restoring said machining conditions stored in said storage means when said detected value falls below said second predetermined threshold value and said fault has been avoided.

10. The adaptive control unit as recited in claim 9 wherein said period setting means comprises:

a voltage divider to detect when said voltage across said electrode and said workpiece falls below said predetermined level;

a memory for storing said predetermined level;

a comparator for comparing said voltage across said electrode and said workpiece with said predetermined level; and a counter, responsive to an output of said comparator, for counting a number of jumps Of said electrode.

11. The adaptive control unit as recited in claim 10, wherein said predetermined level is approximately 40 volts.

12. The adaptive control unit as recited in claim 9, wherein said fault determining means comprises:

a memory for storing said first predetermined threshold level; and a first comparator for comparing said detected relief value with said first predetermined threshold level.

13. The adaptive control unit as recited in claim 9, wherein said machining start completion determining means comprises:

a memory for storing said second predetermined threshold level; and a comparator for comparing said detected relief value with said second predetermined threshold level.

14. The adaptive control unit as recited in claim 9, wherein said first predetermined threshold value is greater than said second predetermined threshold value.

15. The adaptive control unit as recited in claim 9, wherein said machining start completion determining means comprises:

means for selecting said first predetermined threshold value;

a memory device to store said first predetermined threshold value selected by said means; and a comparator for comparing said detected relief value with said first predetermined threshold value and outputting a signal to indicate the completion of the electrical discharge machining start.

16. The adaptive control unit as recited in claim 12, wherein said fault determining means further comprises:

an operator to select a threshold value based upon said detected relief value;

a second memory for storing a third predetermined threshold value;

a second comparator for comparing said threshold value with said third predetermined threshold value; and an AND circuit responsive to respective outputs of said first and second comparators for outputting a signal indicative of a fault.

17. The adaptive control unit as recited in claim 9, wherein said means for changing said machining conditions comprises means for increasing a raising distance of said electrode and decreasing a lowering time of said electrode all at once.

18. A method of adaptive control for an electrical discharge machine which performs electrical discharge machining by applying a voltage pulse across an electrode and a workpiece, comprising the steps of:

a) detecting a voltage across said electrode and said workpiece;

b) detecting a relief amount of said electrode from a deepest position;

c) comparing said voltage with a predetermined voltage value;

d) counting a number of jumps of said electrode when said voltage falls below said predetermined level and outputting a first high signal until the count reaches said predetermined number;

e) comparing said detected relief amount with a first predetermined threshold value and outputting a second high signal when said detected relief amount exceeds said first predetermined threshold value;

f) storing machining conditions of said electrical discharge machine if both said first signal and said second signal are high;

g) changing said machining conditions of said electrical discharge machine to avoid unstable operation;

h) comparing said detected relief amount with a second predetermined threshold value and outputting a third high signal when said detected relief amount falls below said predetermined threshold value to indicate a completion of the start of electrical discharge machining; and i) restoring said machining conditions at said completion of the start of electrical discharge machining.

19. A method of adaptive control for an electrical discharge machine which performs electrical discharge machining by applying a voltage pulse across an electrode and a workpiece, comprising the steps of:

a) defining a period of time beginning with a start of said electrical discharge machining;

b) detecting a fault condition by determining whether a detected relief amount of said electrode from a deepest position thereof exceeds a predetermined threshold value within said period of time;

c) storing machining conditions of said electrical discharge machine if Said fault condition is detected;

d) adjusting said machining conditions of said electrical discharge machine so as to avoid any unstable operation if said fault condition is detected;

e) detecting a completion of said start of said electrical discharge machine by determining when said detected relief amount of said electrode from a deepest position thereof falls below a second predetermined threshold value; and f) restoring said machining conditions when said completion is detected.

* * * * *